United States Patent
Schrag et al.

(10) Patent No.: US 9,964,429 B2
(45) Date of Patent: May 8, 2018

(54) DIAGNOSTIC METHOD FOR A WEIGHING CELL

(71) Applicant: Mettler-Toledo AG, Greifensee (CH)

(72) Inventors: Daniel Schrag, Lufingen (CH); Daniel Rupp, Felben-Wellhausen (CH); Christoph Trautweiler, Regensdorf (CH); Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 266 days.

(21) Appl. No.: 14/864,027

(22) Filed: Sep. 24, 2015

(65) Prior Publication Data

US 2016/0011038 A1    Jan. 14, 2016

Related U.S. Application Data

(63) Continuation of application No. PCT/EP2014/055838, filed on Mar. 24, 2014.

(30) Foreign Application Priority Data

Mar. 28, 2013   (EP) .................................... 13161572

(51) Int. Cl.
   *G01G 23/01*   (2006.01)
   *G01G 7/04*   (2006.01)

(52) U.S. Cl.
   CPC .............. *G01G 23/01* (2013.01); *G01G 7/04* (2013.01); *G01G 7/045* (2013.01)

(58) Field of Classification Search
   CPC ...................... G01G 7/02–7/045; G01G 23/01
   See application file for complete search history.

(56) References Cited

U.S. PATENT DOCUMENTS

| 4,189,017 A | * | 2/1980 | Strobel | .................. G01G 7/045 177/210 EM |
| 4,245,711 A | * | 1/1981 | Kunz | ..................... G01G 1/246 177/210 EM |

(Continued)

FOREIGN PATENT DOCUMENTS

| DE | 10 2009 009 204 B3 | 4/2010 |
| JP | H5-172661 A | 7/1993 |

(Continued)

OTHER PUBLICATIONS

Machine translation of DE 10 2009 009204.*

*Primary Examiner* — Natalie Huls
(74) *Attorney, Agent, or Firm* — Standley Law Group LLP

(57) ABSTRACT

A force-measuring device (1) with a parallelogram linkage has a measurement transducer coupled to it. A coil (25) of the transducer has guided mobility in a magnet system (27) and can carry an electric current (24). A position sensor (21) detects the deflection of the coil (25) from a balanced position relative to the magnet system when a load is placed on the force-measuring device. The electric current (24) flowing through the coil (25), by way of the interaction between the coil and the magnet system, returns the coil and the movable parallel leg to the balanced position. A system-characterizing means (29) is established in a processor unit (26). The system-characterizing means and an unchangeable system reference means (30) are compared to determine the functionality of the device. The functionality is verified by the magnitudes of the electric current and the deflection of the coil from its balanced position.

15 Claims, 5 Drawing Sheets

(56) References Cited

U.S. PATENT DOCUMENTS

| | | | | |
|---|---|---|---|---|
| 4,417,632 A | * | 11/1983 | Lohberg | G01G 7/04 177/212 |
| 4,549,623 A | * | 10/1985 | Baumann | G01G 7/02 177/210 EM |
| 5,056,050 A | * | 10/1991 | Fuchs | G01G 23/01 702/101 |
| 5,191,543 A | * | 3/1993 | Berthel | G01G 23/012 177/50 |
| 5,308,931 A | | 5/1994 | Griffen | |
| 5,644,492 A | * | 7/1997 | Reichmuth | G01G 7/02 177/25.12 |
| 7,282,655 B2 | | 10/2007 | Satoh et al. | |
| 7,317,167 B2 | | 1/2008 | Burkhard et al. | |
| 7,497,137 B2 | | 3/2009 | Tellenbach et al. | |
| 7,690,273 B2 | | 4/2010 | Reber et al. | |
| 9,354,109 B2 | * | 5/2016 | Izumo | G01G 23/01 |
| 2007/0119226 A1 | * | 5/2007 | Tellenbach | G01G 21/30 73/1.15 |
| 2010/0004876 A1 | * | 1/2010 | Loher | G01G 21/30 702/41 |
| 2010/0078228 A1 | * | 4/2010 | Trautweiler | G01G 23/01 177/25.13 |
| 2016/0370221 A1 | * | 12/2016 | Schrag | G01G 7/02 |

FOREIGN PATENT DOCUMENTS

| | | |
|---|---|---|
| JP | H10-104045 A | 4/1998 |
| JP | 2002-148109 A | 5/2002 |
| JP | 2004-219347 A | 8/2004 |
| JP | 2007-12019 A | 1/2007 |

\* cited by examiner

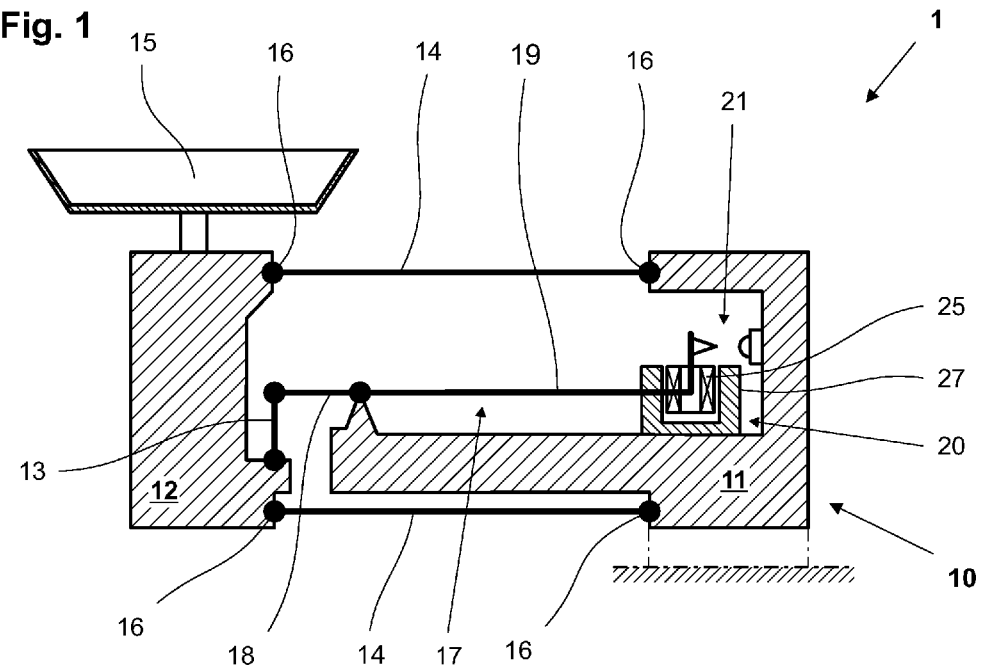
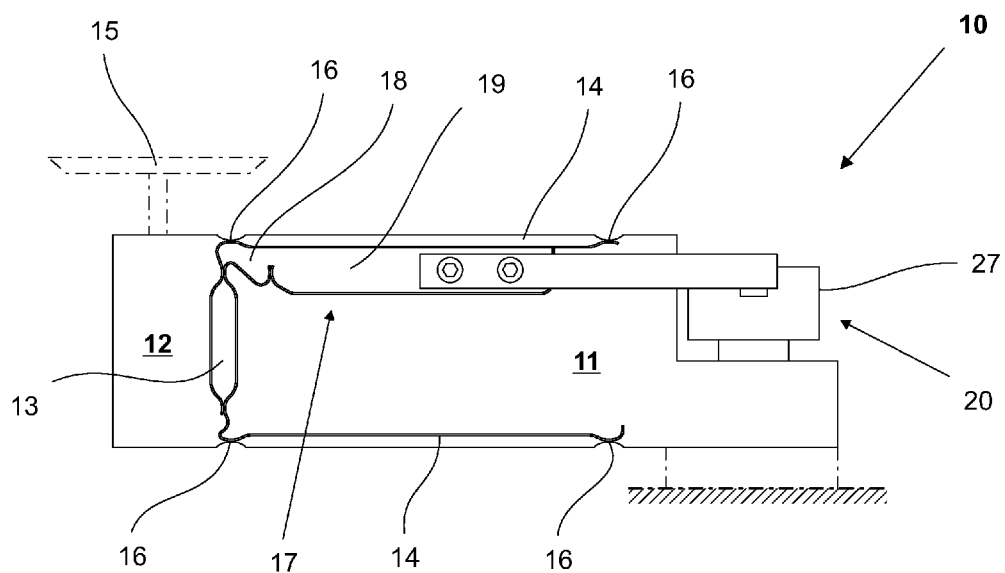

DIAGNOSTIC METHOD FOR A WEIGHING CELL

CROSS-REFERENCE TO RELATED APPLICATIONS

This application is entitled to benefit of a right of priority as a continuation of PCT/EP2014/055838, filed 24 Mar. 2014 designating the United States. The PCT application is in turn entitled to a right of priority from European application 13161572.6, filed on 28 Mar. 2013. The content of each application is incorporated by reference as if fully recited herein.

TECHNICAL FIELD

The invention concerns a method of checking the functionality of a force-measuring device.

BACKGROUND

A weighing cell is a mechanical measurement transducer for the measurement of a mass, wherein the weight force exerted on the weighing cell by the weighing object is converted into an electrical signal. Examples are the strain gage weighing cell, the oscillating string weighing cell or the EMFR (electromagnetic force restoration) weighing cell. Weighing cells are often used in force-measuring devices, specifically in weighing scales, which convert the weight force of a load resting on the scale into an electrical signal.

In weighing cells which operate according to the principle of electromagnetic force compensation, the weight force of the weighing object is transmitted to an electromechanical measurement transducer either directly or by way of one or more fulcrum-supported force-transmitting levers. The measurement transducer produces a compensating force corresponding to the weight force of the weighing object and provides an electrical signal which is further processed and presented on a display by an electronic module of the processing unit.

An EMFR weighing cell includes a parallelogram linkage with a stationary parallel leg and with a movable parallel leg which serves as load receiver and is connected to the stationary leg by two parallel guides. In systems with a lever-reduction mechanism, a coupling element which is stiff in tension and flexible in bending is coupled to the load receiver and transmits the weight force to a balance beam whose fulcrum is supported by the stationary parallel leg. The purpose of this kind of weighing cell is to reduce the weight force of the weighing load to a magnitude where the measurement transducer is able to generate a compensating force and produce a measurement signal representative of the weight force. As is known in the art, the joints between the individual elements in weighing cells of high resolution are configured as flexure pivots. Flexure pivots define an axis of rotation between the two elements coupled by the pivot. In a weighing cell made of one integral piece of material, also referred to as a monolithic weighing cell, the flexure pivots can be realized in the form of thin material connections between the elements.

In EMFR weighing cells of a kind where the weight force is counteracted directly by the compensating force generated by the measurement transducer, i.e. without reduction by means of a lever system, the parallel guides are configured mostly as spring elements, elastic joints or diaphragm springs. In weighing cells of this kind, which are also referred to as direct-measuring systems, an individual measurement transducer opposes the weight force of the load with a compensating force of equal magnitude. If a plurality of measurement transducers is combined to counteract the weight force, each of them produces a corresponding partial compensation force.

In force-measuring devices of high resolution, the flexure pivots are thinner and therefore also more susceptible to suffer damage which can affect the weighing result or render the force-measuring device unusable. For example, if the weighing pan is hit or if the balance is dropped or set down abruptly, the parallel guides and other components can be stressed excessively. As a consequence, flexure pivots, elastic joints or diaphragm springs can become bent out of shape, cracked or even be destroyed.

A measurement transducer used in an EMFR weighing cell can for example be configured as a current-conducting coil in a permanent magnet. The coil is in most cases arranged on the balance beam, while the permanent magnet is attached to the stationary parallel leg. However, the reverse arrangement is also possible, where the permanent magnet is arranged on the balance beam and the coil on the stationary parallel leg. In the operating state of a force-measuring device, an electric current flows through the coil, whereby a compensating force is generated which counteracts the load place on the balance. A position-measuring device registers the deflection of the coil from its balanced position, whereupon a regulating unit regulates the magnitude of the current in response to the position measurement signal in such a way that the coil returns to its balanced position. When the coil is in its balanced position, i.e. when the sum of the forces acting on the system is equal to zero, the magnitude of the electric current is measured to determine the weighing result, which is then displayed.

An excessive amount of stress of the kind mentioned above can also affect the coil in the magnet system or the position-measuring device. In the production process of a force-measuring device, the step of adjusting the weighing cell is important for the sensitivity and accuracy of the device. The adjustment settings are valid only as long as the device is in the state in which the adjustment was performed. Under an excessive amount of stress, the alignment of the coil in the magnet system can change, or the position-sensing device can become dislocated relative to the balance beam, with the consequence that the weighing result is no longer correctly determined.

If the force-measuring device still delivers what appears to be a measurement of the weighing load in spite of damage to the weighing cell, be it in a flexure pivot or from a position change of the coil in the magnet system or of the position-measuring device relative to a position in which the force-measuring device was calibrated, the damage is not recognizable by currently available means. In spite of the damage, the force-measuring device delivers a weighing result, even though it is incorrect, as the force-measuring device does not appear to be functionally impaired, i.e. it seems to work error-free.

A method of monitoring and/or determining the condition of a force-measuring device is disclosed in EP 1 785 703 A1, wherein the force-measuring device includes a force-measuring cell that is set up in an interior space of a housing, as well as a sensor which measures climate-related parameters in the interior space which affect the operating lifetime of the force-measuring device. The method allows the condition of a force-measuring device to be monitored without the need to open the housing in order to determine the condition of the force-measuring device. However, this method has the disadvantage that a damaged condition of the weighing cell due to excessive stress, for example a damaged flexure pivot or a dislocation of the coil or the position-measuring device, cannot be detected.

To ensure that the force-measuring device is functioning correctly and that the user can have confidence in the displayed measurement value, the weighing cell has to be checked at regular intervals. This periodic inspection is in most cases performed by the manufacturer, which causes downtime of the force-measuring device at a cost to the user.

The objective of the present invention is to provide a method of verifying the functionality of a force-measuring device.

It should further be possible that the method can be performed at the work location of the force-measuring device and by the force-measuring device itself.

SUMMARY

According to the invention, these tasks are solved by a method of verifying the functionality of a force-measuring device that works according to the principle of electromagnetic force compensation as set forth in the claims appended hereto.

The force-measuring device includes a stationary parallel leg and a movable parallel leg which serves to receive the load of a weighing object placed on the device and is connected to the stationary leg by parallel guides. The force-measuring device further includes a measurement transducer which is coupled to the parallel leg through a force-transmitting connection and contains a coil that is arranged with guided mobility in a magnet system and can carry an electric current. Also included in the force-measuring device is a position sensor which serves to detect the position change of the coil from its balanced position relative to the magnet system that occurs as a result of placing a load on the movable parallel leg. The electric current flowing through the coil, by way of the electromagnetic force between the coil and the magnet system serves to return the coil and the movable parallel leg connected to the coil or the magnet system to the balanced position and/or to maintain it in the balanced position.

According to the invention, at least one system-characterizing means of the force-measuring device is established by means of a processor unit, and the system-characterizing means is compared to at least one unchangeable system reference means that is stored in a persistent memory file of the processor unit. Based on the comparison, the functionality of the force-measuring device is determined, whereupon an action of the force-measuring device occurs, and wherein the magnitude of the electric current and the magnitude of the deflection of the coil from its balanced position are used for the verification of the functionality.

Due to the method according to the invention, the force-measuring device is able to use the deflection of the coil from its balanced position, or the position of the coil within the magnet system, for the verification of the functionality, as the magnitude of the deflection of the coil from its balanced position is supplied as additional input information to the processor unit.

The measurement transducer can be arranged in different ways in the force-measuring device. Either the coil is attached to the movable parallel leg and the magnet system to the stationary parallel leg, or the coil is attached to the stationary parallel leg and the magnet system to the movable parallel leg. In either case the coil and the magnet system can move in relation to each other. The electric current flowing through the coil, which is in most cases regulated by a PID controller, causes in both cases an electromagnetic force between the coil and magnet system which returns the coil to its balanced position relative to the magnet system and/or maintains the coil in said position when a load is placed on the load-receiving part. The coil, which is arranged with guided mobility in the magnet system, can be configured with one or more windings. The magnet system itself can be a permanent magnet or an electromagnet with a current flowing through it. In the most common configuration, the magnet system is attached to the stationary part, while the coil is either directly attached to the load-receiving part or coupled to the latter by way of one or more levers. This arrangement is preferred in most cases, because the smaller inertial mass, in this case the mass of the coil, allows a faster return to the balanced position or a more stable adherence to the balanced position. However, there are also force-measuring devices in which the magnet system in the form of a permanent magnet is attached to the movable part, for example in order to simplify the transmission of the electric current to the coil.

The balanced position is the position of the coil in the magnet system where all of the forces acting on the system are in equilibrium with each other. In lever systems, this also corresponds to the zero position of the balance beam. Due to the connection of the coil with the balance beam, a deflection of the balance beam from the balanced position is equivalent to a deflection of the coil from the balanced position. The same applies to the case where the magnet system, instead of the coil, is connected to the balance beam. The part of the force-transmitting connection that the term "balance beam" refers to in the present context is the one- or two-armed lever whose balanced position is monitored by the position sensor. In a preferred arrangement, the axis of rotation of the balance beam, the mass center of gravity of the balance beam, the connection of the first lever arm to the coupling and the effective point of application of the resultant force of the measurement transducer lie in a common plane. If this condition is met and if there is no weighing load placed on the force-measuring device, the balance beam is in a moment-free condition and always in equilibrium, even if the force-measuring device is standing on an inclined supporting surface. The plane defined by the aforementioned points is also referred to as the level-indifferent plane.

In a direct-measuring system, the coil or the magnet system of the measurement transducer is attached to a force-transmitting rod which is directly connected to the load-receiving part, so that there are no levers for the reduction of the applied force. In direct-measuring systems, a deflection of the coil or the magnet system from its balanced position is equivalent to a deflection of the force-transmitting rod from its balanced position.

A preferred application for a method according to the present invention is in microbalances, as they have in most cases very thin flexure pivots. These balances can measure a weighing load of ten grams with a measurement resolution of 0.001 milligrams, i.e. with a precision of one part in ten million. It therefore takes only a relatively small amount of overstressing to cause damage to a flexure pivot in a microbalance.

The invention is suitable for force-measuring device with a measurement transducer that operates in a push mode as well as those that generate the compensating force in a push-pull mode. The difference lies in the directionality of the compensating force: a push system can generate a compensating force only in one direction, while a push-pull system is designed to produce a compensating force in the two opposite directions.

The deflection of the coil from its balanced position is determined and quantified by means of the position sensor and sent to a position controller as input for the regulation of the electric current through the coil, so that as a result of the electromagnetic force between the coil and the magnet system, the coil and the parallel leg that is connected to the coil or to the magnet system are returned to the balanced position. Alternatively, the magnitude of the deflection of the coil from the balanced position can also be determined by means of an additional position sensor. The kinds of sensors that can be used as additional position sensors can acquire as a sensor signal the same information about the magnitude of the deflection of the coil inside the magnet system as the position sensor for the position measurement. For example, this sensor signal could be provided by an acceleration sensor, a velocity sensor, or an angular or linear position sensor in order to deliver the respective information to a processor unit.

The preferred choice for the position sensor is an optoelectronic position sensor whose sensor signal corresponds to the deflection of the mutually connected movable parts of the weighing cell from a balanced position which occurs as a result of placing a load on the load receiver. An optoelectronic position sensor of this kind typically includes a light sender and a light receiver which are arranged on the stationary parallel leg facing each other across an interstitial space, as well as a barrier vane traversing the interstitial space and participating in the deflection of the movable parts. The signal of the position sensor is presented to the position controller which, in response, regulates the electric current through the coil in such a way that the barrier vane and the movable parts of the weighing cell to which the vane is connected are returned to their balanced position by the electromagnetic force between the coil and the permanent magnet. In other words, as a result of the regulation, the electromagnetic force between the coil and the magnet system is in equilibrium with the weighing load.

The system, as the term is used here, includes the weighing cell with all of the properties of its components (parallelogram, lever reduction mechanism, flexure pivots, measurement transducer, position sensor) and the factors by which they are influenced. Properties such as material properties, section moduli, homogeneity of the magnetic field and linearity of the position sensor depend on different influence factors. Temperature changes, ground vibrations and oscillations, or shocks to the weighing cell affect the system or can even cause a permanent change. The reference means of the system describes the faultless condition corresponding to the performance of the system at the end of the production or assembly process or at the time of delivery to the user. This system reference means is stored in a persistent memory file of the processor unit of the force-measuring device. The system-characterizing means characterizes the current condition or functionality of the system and is determined when necessary and/or at prescribed time intervals. The system-characterizing means thus characterizes the current condition or functionality of the force-measuring device. A deviation of the system-characterizing means from the system reference means therefore indicates a change in the condition or in the ability to function properly.

According to a further developed embodiment of the invention, the at least one system-characterizing means and the at least one system reference means each establish a relationship between the magnitude of the electric current and the magnitude of the deflection of the coil from its balanced position.

In an advantageous further development of the invention, the at least one system reference means represents the functionality of the force-measuring device at the time of the initial adjustment, in particular the adjustment that took place during production or close to the completion of the force-measuring device, and/or reflects the condition of a fault-free functionality of the force-measuring device.

According to a further developed embodiment of the invention, the at least one system-characterizing means and/or the at least one system reference means each include a system table listing the respective values of the weight force associated with different magnitudes of the deflection of the coil from its balanced position and/or a system function with at least one parameter and with at least the magnitude of the deflection of the coil from its balanced condition and the magnitude of the electric current as input quantities. The at least one parameter of the system function in the context of the invention means a variable of a mathematical function which describes the relationship between the magnitude of the deflection of the coil from its balanced position and the magnitude of the electric current.

When a system table is used, the comparison of the system-characterizing means against the system reference means is made by selecting the respective comparison value from a table in which values are listed according to the magnitude of the deflection of the coil from its balanced position and according to the magnitude of the current. The term system function in this context means a mathematical function with at least two input quantities and at least one parameter.

According to a further embodiment of the invention, the at least one parameter of the system function is stored as a parameter table, from which the respective parameter of the system function is selected in accordance with the magnitude of the deflection of the coil from its balanced position and the magnitude of the current. In addition, the at least one parameter of the system function can be load-dependent.

According to another advantageous development of the invention, the values of the system table and/or the at least one parameter of the system function are determined by varying the deflection of the coil and measuring at essentially the same time the magnitude of the electric current associated with the deflection of the coil from its balanced position, and/or by varying the magnitude of the electric current and measuring at essentially the same time the magnitude of the deflection of the coil associated with the magnitude of the electric current.

In an advantageous embodiment of the invention, the values of the system table and/or the at least one parameter of the system function are each determined without a weight as well as with a weight applied to the movable parallel leg, wherein the weight can be an externally handled weight or one that is set in place internally by a handling mechanism. The determination of the values and/or of the at least one parameter under different load conditions improves the accuracy of the verification of the functionality over the entire weighing range of the gravimetric force-measuring device.

According to another aspect of the invention, the at least one system reference means is established individually for each force-measuring device or generically for a given type of force-measuring device. Obviously, each force-measuring device is subject to individual variations within the manufacturing tolerances of the magnet system, the flexure pivots, the position-measuring sensor and the lever-reduction mechanism and therefore has its own values and/or parameters which are specific to the one force-measuring device.

In order to accelerate the determination of these values and/or parameters in the production of the force-measuring device, a system reference means established generically based on the arithmetic mean of previously determined reference means can be stored in the processor unit.

According to a particularly advantageous development of the invention, the comparison is used to investigate a fracture or tear and/or deformation of a pivot of the parallel-guiding mechanism and/or a position change of the coil in the magnet system relative to an original position and/or a position change of the position sensor relative to an original position, wherein the original positions in each case are associated with the condition of the force-measuring device for which the system reference means was established.

A preferred embodiment of the invention is distinguished by the feature that a trend line of the functionality is established based on the currently determined system-characterizing means and the previously established system-characterizing means and that a prognosis can thereby be made for the functionality, in particular for the time remaining until the next service of the force-measuring device.

A force-measuring cell for a gravimetric force-measuring device that works in accordance with the principle of electromagnetic force compensation, with a force-transmitting mechanical connection between a measurement transducer with a coil that moves in a magnet system and a movable parallel leg, wherein either the coil or the magnet system is connected to the movable parallel leg, is distinguished by the feature that the force-measuring cell includes a position sensor which detects the deflection of the coil from its balanced position which occurs as a result of placing a load on the movable parallel leg, whereby the magnitude of the deflection of the coil from its balanced position can be determined, and wherein the magnitude of the deflection of the coil from its balanced position can be used in a method for the verification of the functionality.

In a computer-assisted program for the execution of the method of verifying the functionality of a gravimetric force-measuring device that operates according to the principle of electromagnetic force compensation, a signal is issued to initiate an action of the force-measuring device, for example to release or to lock up the force-measuring device. The force-measuring device includes a coil which moves in a magnet system and can conduct an electric current which—as a result of the electromagnetic force acting between the coil and the magnet system—serves to return the coil and the movable parallel leg connected to the coil or the magnet system to the balanced position and/or to maintain it in the balanced position, as well as a force-transmitting mechanical connection between the coil and a movable parallel leg, and a sensor for the detection of a deflection of the coil from its balanced position which occurs as a result of placing a load on the movable parallel leg. The input quantities of the computer-assisted program include at least the magnitude of the electric current and the magnitude of the deflection of the coil from its balanced position.

According to a further developed embodiment of the computer-assisted program, the latter retrieves a system reference means and at least one system-characterizing means. The system-characterizing means can be stored in the working memory of the unit that executes the program, while the system reference means is stored in a persistent memory file.

BRIEF DESCRIPTION OF THE DRAWINGS

The subject of the invention will be explained in the following through examples of preferred embodiments which are illustrated in the attached drawings, wherein:

FIG. 1 schematically represents a sectional view of a force-measuring cell of a top-loading force-measuring device designed as a lever system, seen from the side;

FIG. 2 illustrates a monolithically constructed force-measuring cell designed as a lever system, seen from the side;

DETAILED DESCRIPTION

Figure 6:
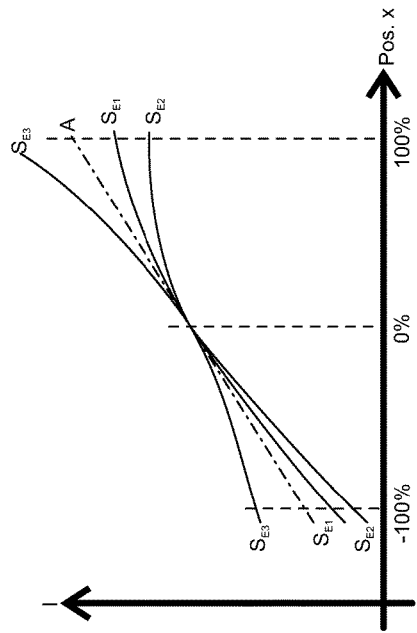
FIG. 6 represents a position/current graph over the entire deflection range of the coil, with the system functions $S_{E1}$, $S_{E2}$ and $S_{E3}$ of a system reference means and an ideal system function A.

In the following description, features that have identical functions and similar configurations are identified by the same reference symbols.

FIG. 1 schematically illustrates a force-measuring cell 10 of a force-measuring device 1 designed as a lever system, seen from the side in a sectional view. By way of the stationary parallel leg 11, the force-measuring device 1 stands on a supporting structure. The load to be measured is placed on a weighing pan 15 that rests on the movable parallel leg 12 which is connected to the stationary parallel leg 11 by way of two parallel guides 14. The parallel guides 14 are connected by way of flexure pivots 16 to the movable parallel leg 12 and to the stationary parallel leg 11. Flexure pivots 16 define an axis of rotation and in the directions transverse to the axis of rotation, they behave as practically rigid force-transmitting elements. The force-measuring device does not necessarily have to be configured with the weighing pan on top as shown here. It can likewise be realized with a hanging pan, in most cases with a hanger mechanism. The coupling 13 transmits the weight force to the first lever arm 18 of the balance beam 17 which is supported by a fulcrum. Attached to the other end of the balance beam 17, i.e. to the outer end of the second lever arm 19, is the measurement transducer 20 which counteracts the lever-reduced weight force of the weighing load with a compensation force. The measurement transducer 20 shown here is shown as a current-conducting coil 25 which is immersed with guided mobility in a magnet system 27. When the compensation force generated by the measurement transducer 20 at the second lever arm 19 corresponds to the weight force of the load at the first lever arm 18, the balance beam 17 is in equilibrium and thus in the balanced position. This balanced position is monitored by a position sensor 21.

When a mass or a force is applied to the weighing pan 15, the movable parallel leg 12 is deflected downward, guided in parallel motion by the parallel guides 14. The balance beam 17, which is connected to the movable parallel leg 12 through the coupling 13, transmits this movement with a defined reduction ratio to the other end of the balance beam 17 which faces towards the measurement transducer 20. The position sensor 21 generates a position signal 22 corresponding to the deflection of the coil 25 from the balanced position. This position signal 22 is sent as input signal to a position-controller unit which regulates an electric current 24 through the coil 25 in such a way that, due to the resultant compensation force, the coil 25 and the balance beam 17 to which the coil is connected are returned to the balanced position. In the stationary state of the regulation (when the coil 25 has returned to its balanced position), the magnitude of the electric current 24 flowing through in the coil represents a measure for the quantity that is to be determined, i.e. the mass or force acting on the movable parallel leg 12. The magnitude of the electric current 24 is measured by means of a processor unit 26 (see FIG. 3), and the result is subsequently presented on a display as the measurement value.

FIG. 2 illustrates a possible configuration of a force-measuring cell 10 of a force-measuring device 1 of monolithic construction, seen from the side in a sectional view. The stationary parallel leg 11, the movable parallel leg 12, the coupling 13, the parallel guides 14 and the balance beam 17 are integrally connected to each other, made out of one homogeneous block of material. All of these elements are formed out of a metal block through suitable manufacturing techniques to separate them, for example chip-removing machining processes, cutting, or spark erosion. The flexure pivots 16, the fulcrum of the balance beam and the connecting ends of the coupling 13 are formed as thin material bridges, wherein the material thickness of the flexure pivots 16 is adapted to the capacity range of the force-measuring device 1, so that the material bridges of the flexure pivots 16 are designed stronger for larger weighing capacities.

Figure 3:
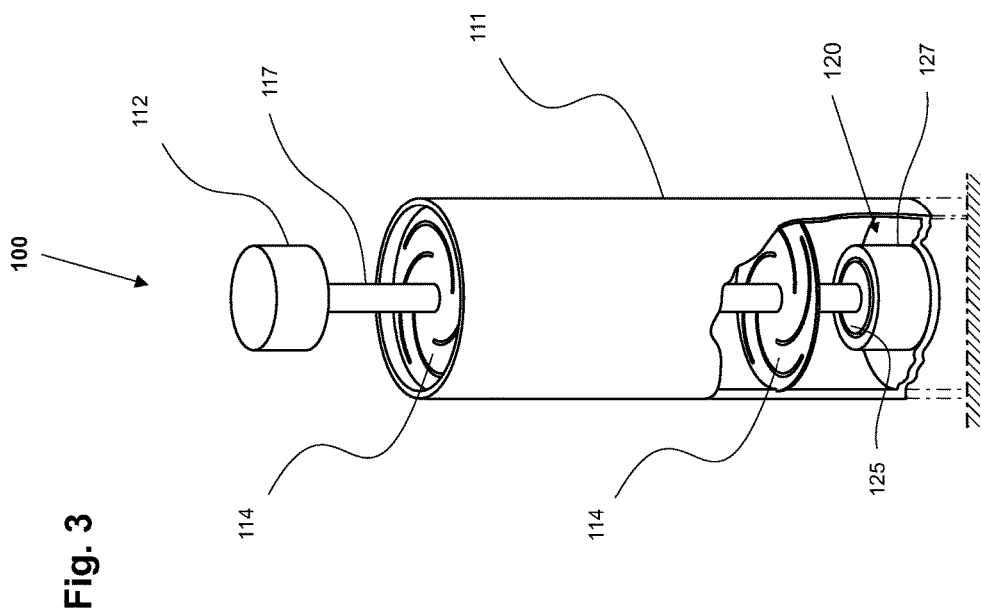
FIG. 3 illustrates a force-measuring cell designed as a direct-measuring system.

FIG. 3 illustrates a possible embodiment of a force-measuring cell 100 designed as a direct-measuring system. The stationary parallel leg 111 rests on the supporting ground structure. The movable parallel leg 112 which serves to receive the load is connected to a force-transmitting rod 117 and is guided by parallel guides 114 which in this example are configured as diaphragm springs. In this embodiment, the measurement transducer 120 is arranged at the lower end of the force-transmitting rod 117, wherein the coil is shown connected to the movable parallel leg 112 and the magnet system 127 is arranged at the stationary parallel leg 111. Further realizations of this concept would be possible by arranging the measurement transducer 120 in the area between the parallel guides 114 and/or by switching places in the arrangement of the magnet system 127 and coil 125.

The thinner a material bridge of a material connection or a spring pivot or diaphragm is designed, the more suscep-tible a force-measuring cell 10, 100 will be to damage resulting from shocks directed at the movable parallel leg 12, 112, impact forces from being dropped or set down abruptly, or other exposures to excessive stress. As a consequence, the material bridges, flexure pivots, or diaphragm springs can become bent out of shape, cracked or even entirely broken or torn apart.

The position sensor 21 and the measurement transducer 20, 120 are likewise susceptible to shocks, excessive stress conditions and/or collision impact forces. These components of a force-measuring device 1 are adjusted in their positions and alignments during the manufacturing process or close to the time of completion of a force-measuring device 1. A subsequent adjustment of the force-measuring device 1 is therefore always referenced against the position in which the force-measuring device was originally set up and aligned. If a position of a component deviates from the original position, it will cause an error in the weighing result that is not noticeable to the user.

In spite of damage to the force-measuring cell 10, 100, be it in a material connection, a flexure pivot, a diaphragm spring or from a dislocation of the coil or the position-measuring device relative to a position in which the force-measuring device 1 was calibrated, it may still be possible to perform what appears to be a valid weighing, since a damage of the aforementioned kind is not recognizable by currently available means. In spite of the damage, the force-measuring device 1 delivers a weighing result, albeit an incorrect one, as the force-measuring device appears to be unimpaired and to work in an error-free manner.

Figure 4:
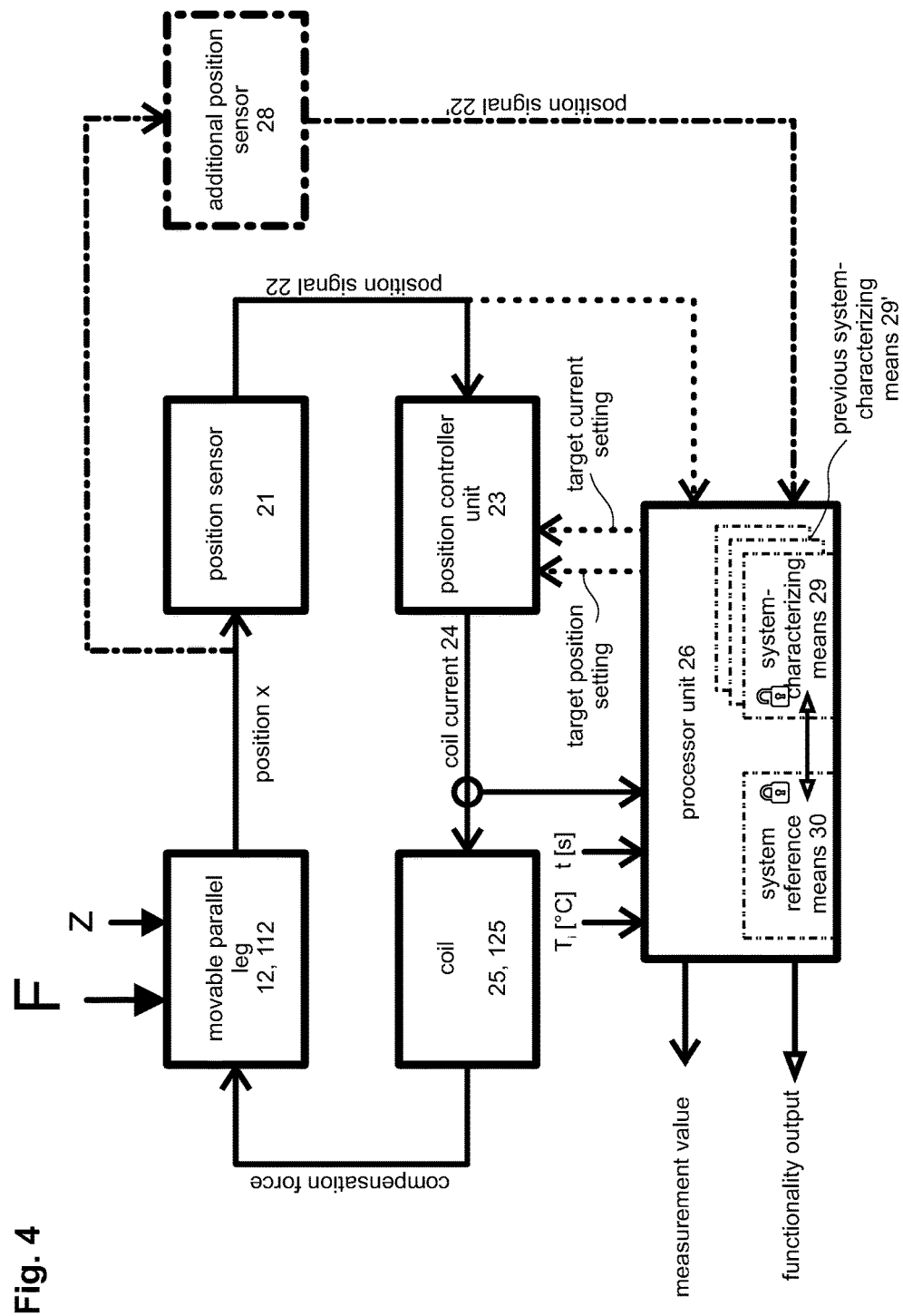
FIG. 4 shows a block diagram through which the flow of functions in a force-measuring device according to the invention is described.

In the following, the flow of functions in the operation of a force-measuring device 1 is described in more detail by following the block diagram of FIG. 4. A load placed on the weighing pan 15 exerts a force F on the movable parallel leg 12, 112. The balance beam 17 with the coil 25 connected to it, or the magnet system 27 connected to the balance beam 17, or the force-transmitting rod 117 with the coil 125 connected to it, or the magnet system 127 connected to the force-transmitting rod 117 is displaced from its balanced position, i.e. they move into a different position. The new position x is detected by the position sensor 21 and sent as a position signal 22 to a position controller unit 23. In response to the position signal 22, the position controller unit 23, in most cases a PID controller, continuously determines the magnitude of the coil current 24 that is needed to return the system to its balanced position. As a result of the electrical coil current 24, the coil 25, 125 causes a magnetic field and, through interaction with the magnet system 27, 127, generates a compensating force which returns the balance beam 17 or the force-transmitting rod 117 with the coil 25, 125 to the balanced position. The same cycle continuously repeats itself in the sense of a closed-loop regulation to maintain the system in its balanced position. This control loop regulates the deflection of the balance beam 17 or the force-transmitting rod 117 dynamically, i.e. several times a second, for example in the range of 500 Hz to 10 kHz.

Since the electric current 24 represents a direct measure for the compensating force, the electric current 24 is measured and the result is used by the processor unit to calculate the weight force as the value to be displayed. Additional factors that enter into the calculation of the displayed value by the processor unit 26 include for example the ambient temperature, the temperature of the magnet, as well as time-dependent dynamic effects.

The method of verifying the functionality according to the invention is distinguished by the feature that, in addition to the magnitude of the electric current 24, the processor unit uses the position signal 22 of the position sensor 21, i.e. the magnitude of the deflection of the coil 25, 125 from its balanced position, for the assessment of functionality. This is indicated in FIG. 4 by the broken line. Instead of the position signal 22, it is also possible to provide input signals to the processor unit 26 which contain the same information regarding the position x, i.e. the position of the coil 25, 125 within the magnet system 27, 127. This is indicated by the dash-dotted line in FIG. 4. This information could for example be sent to the processor unit 26 in the form of a position signal 22' from a second, additional sensor 28, for example an acceleration sensor, a velocity sensor, or an angular or linear position sensor.

Accordingly, the force-measuring device 1 is able to use the amount of the deflection of the coil 25, 125 from its balanced position in the verification of the functionality, and thus to take into account if there is damage for example to the magnet system 27, 127, the position-measuring system, or in particular the flexure pivots, the elastic joints or the diaphragm springs of the parallel guides 14, 114 or the lever-reduction system.

The system reference means 30 which was established in the course of an adjustment of the force-measuring device 1 (see the description of FIG. 5) is stored in the processor unit 26. The system reference means 30 is stored in a persistent memory file, i.e. a non-volatile memory, and can only be overwritten in a new adjustment of the force-measuring device 1. This is indicated in FIG. 4 by the symbol of the closed padlock. In contrast, the system-characterizing means 29 can be updated during operation of the force-measuring device 1, for example after a verification of functionality has taken place. However, the no longer current system-characterizing means does not have to be erased but can remain stored in the processor unit 26, for example in order to establish a trend history of the functionality of a force-measuring device 1.

The term "calibration" refers to the process of determining a deviation between the measurement value and the true value of the measured quantity under given measurement conditions without making a correction. On the other hand, if a correction is made, the process is called adjustment. For example, when a balance is adjusted manually by trained personnel fine-tuning its functions with the appropriate tools, or semi-automatically by the user placing an external or built-in reference weight on the load receiver, or automatically if the balance is equipped with an adjustment mechanism including a reference weight, the deviation is corrected.

Figure 5:
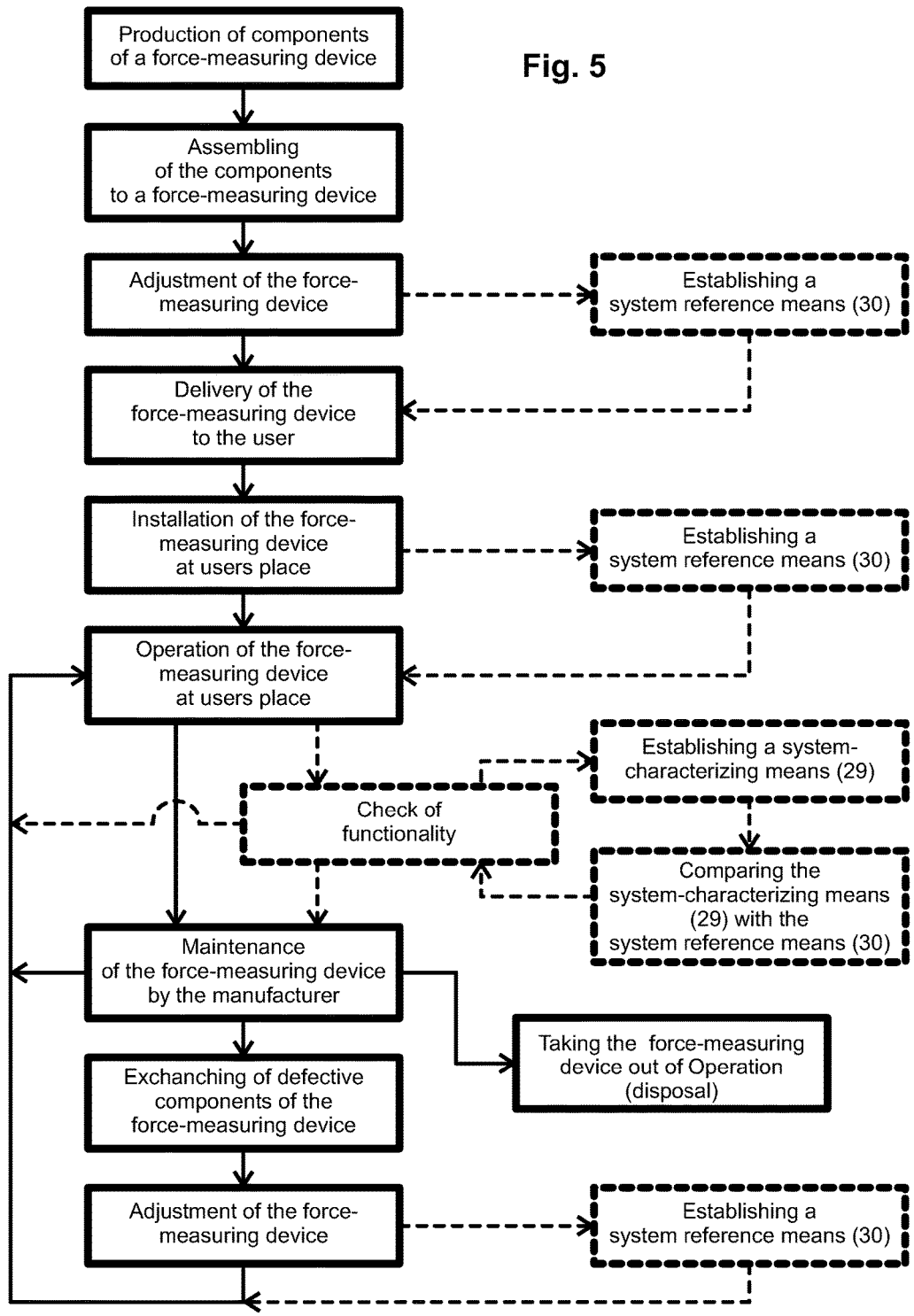
FIG. 5 shows a block diagram through which the life cycle of a force-measuring device according to the invention is described.

In the form of a block diagram, FIG. 5 illustrates the life cycle of a force-measuring device 1. It begins with the production of all parts and components and their assembly into a force-measuring device 1. Normally as a next step or close to the time of completion of the force-measuring device 1, a calibration as well as an adjustment of the components and parts of the force-measuring device 1 takes place. This includes that a system reference means 30 is established which is representative of the condition of faultless functionality. This system reference means 30 is stored in a persistent memory file in the processor unit 26. The system reference means 30 can be stored in the form of a system table or a system function with at least one parameter. In addition, further adjustment settings of the force-measuring device 1 can be stored in the processor unit 26.

A system reference means 30 can be established individually for each force-measuring device 1 or generically for a given type of force-measuring device 1. For a generically determined system reference means, an arithmetic mean value can be established based on previously determined reference means and can then be used for all force-measuring devices 1 of the same type.

The force-measuring device 1 can now be delivered to the user and put into operation. For specialized force-measuring devices 1 which are adapted to particular operating conditions such as for example the permanent presence of a pre-load, the determination of the system reference means can be deferred to the time of installation at the user location. Force-measuring devices according to the current state of the art have to be checked at certain time intervals by the manufacturer to verify their function and to satisfy the accuracy requirements of national regulations, calibration requirements and/or industrial standards. This can be done on location by a service technician or at the facility of the manufacturer of the force-measuring device 1.

If damage is detected in the functionality check by the manufacturer and if the cost of repair does not appear worthwhile, the force-measuring device 1 is taken out of operation. If the functionality check has a positive result, the force-measuring device 1 can continue to stay in use for the next time interval. If the force-measuring device is connected to a communications network, a report can be sent automatically to the manufacturer. This keeps the manufacturer informed on the functional status of the force-measuring device, so that appropriate steps can be taken if necessary.

As a third possibility in a case where a damaged condition has been identified, the components that have become defective or whose functionality is deficient can be exchanged. This needs to be followed by a new adjustment of the components and parts of the force-measuring device 1 by the manufacturer. In the process, a new system reference means 30 is determined and stored in the processor unit 26 in a persistent memory file, with the previous system reference means 30 being overwritten. In addition, other adjustment settings can be stored in the processor unit 26 at the same time. Subsequently, the force-measuring device 1 is released to be put into operation again by the user.

The method according to the invention, which is illustrated in FIG. 5 by the broken lines, is inserted into this life cycle before the periodic maintenance service is performed by the manufacturer, in order to verify during the time interval between two maintenance services that the force-measuring device 1 is functioning properly. One can thus ascertain already prior to an actual maintenance service whether the device functions properly or its functionality is compromised. This prevents the use of the force-measuring device 1 in case of a latent defect where the force-measuring device 1 appears to the user to be undamaged so that it seemingly functions in a faultless manner. On the other hand, the time interval between two maintenance services could also be extended as long as the functionality test shows a positive result, whereby the user saves the cost of downtime associated with taking the force-measuring device 1 out of operation for servicing.

In each cycle of the method according to the invention, the at least one system reference means 30 is compared to at least one system-characterizing means 29, and based on the comparison the functionality of the force-measuring device 1 is determined. Both the system-characterizing means 29 as well as the system reference means 30 establish a relationship between the magnitude of the electric current 24 and the magnitude of the deflection of the coil 25, 125 from its balanced position and can exist in the form of numerical values in a system table or a system function with at least one parameter. The system reference means 30 which is stored in a persistent memory file of the processor unit 26 represents the faultless condition of the force-measuring device 1, while the system-characterizing means 29 represents the actual functional condition of the force-measuring device 1 at the current time.

Prior to the comparison of the system-characterizing means 29 against the system reference means 30, the system-characterizing means 29 has to be established in the form of numerical values in a system table or system function with at least one parameter. The determination of the values of the system table or system function with at least one parameter as a step that precedes the comparison of the system-characterizing means 29 against the system reference means 30, as well as the determination of the values of a system table or the system function with at least one parameter for the system reference means which occurs at the time the adjustment can be performed in different ways.

In the following, possible ways to determine the values of a system table as well as a system function with at least one parameter are demonstrated. The determination is made advantageously during the production process of the force-measuring device 1, in particular during the adjustment phase. As a first possibility, the determination is made by varying the deflection of the coil 25, 125 and essentially at the same time measuring the amount of electric current 24 associated with the deflection of the coil 25. Alternatively, as a second possibility, the determination is made by varying the amount of electric current 24 and essentially at the same time measuring the deflection of the coil 25, 125 corresponding to the of magnitude of the electric current 24. In order to be able to vary the deflection of the coil 25, 125 or the magnitude of the electric current 24, the processor unit can set a target position or a target current by means of two interface connections to the position controller unit 23.

The two procedures that have been described above for the determination of the values of a system table and/or a system function with at least one parameter can also be supplemented by performing them again with the additional step of placing a calibration weight on the load receiver. Based on a measurement with the calibration weight and a measurement without the calibration weight, a separate respective system reference means 30 and/or system-characterizing means 29 can be established for the magnet system 27, 127, for the parallel guides 14, 114 and their flexure pivot 16 or elastic joints, the position sensor 21 and/or the lever transmission ratio.

Based on the system-characterizing means 29 and the previously determined system-characterizing means 29', it is possible to establish a trend history of the functionality, which allows the remaining operating time until the next maintenance service of the force-measuring device to be predicted.

If the force-measuring device 1 is equipped with an internal calibration weight which can be coupled to the movable parallel leg 12, 112 and which is activated when a calibration is required, the force-measuring device 1 can, depending on the application, perform one or more of the aforementioned possible procedures for the determination of the values of a system table and/or the system function with at least one parameter, either under the control of a menu or autonomously.

After the functionality has been verified, the processor unit 26 can release the force-measuring device 1 for operation, lock the force-measuring device 1, or issue a warning to the user, or generally initiate an action of the force-measuring device 1. A warning can include the information that a maintenance service is imminent or that the functionality is impaired.

FIGS. 6 to 10 illustrate different system functions of force-measuring devices 1 in the form of position/current graphs. The system function establishes a relationship between the magnitude of the electric current 24 and the magnitude of the deflection of the coil 25, 125 from its balanced position. This is a possible form of representation of a system-characterizing means 29 or a system reference means 30. The plus and minus 100% marks on the horizontal axis define the out-of-balance deflection of the coil 25, 125 in the magnet system 27, 127.

FIG. 6 shows a system function A of an idealized force-measuring device 1 with an ideal behavior of the flexure pivots 16 or elastic joints and of the magnet system 27, 127 drawn as a straight line, which means that a deflection of the coil 25, 125 from its balanced position causes a linear change of the electric current 24. In contrast to the system function A, the system functions $S_{E1}$, $S_{E3}$ and $S_{E3}$ reflect the real behavior of the magnet system 27, 127 and also represent a system reference means 30.

Figure 7:
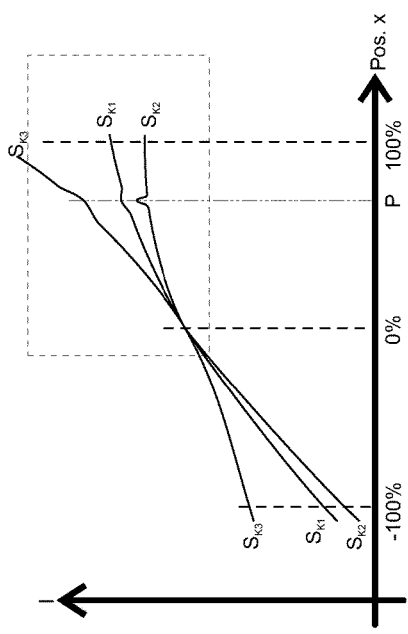
FIG. 7 represents a position/current graph over the entire deflection range of the coil, with the system functions $S_{K1}$, $S_{K2}$ and $S_{K3}$ of a system-characterizing means of a force-measuring device in which the flexure pivots, elastic joints or diaphragm springs have been damaged.

If the force-measuring device 1 is subjected to an excessive stress load, caused for example by hitting the weighing pan 15 or dropping the device on the ground, the system functions will change. FIG. 7 represents a system-characterizing means 29 with the system functions $S_{K1}$, $S_{K2}$, $S_{K3}$ of a force-measuring device 1 in which at least one flexure pivot 16 or an elastic joint or a diaphragm spring has been damaged by an excessive stress load. Clearly evident are the irregular shapes of the system function graphs, specifically the deviations of the system functions at the deflected position P. Such symptoms of a damaged flexure pivot 16 or elastic joint or of a damaged diaphragm spring can take on very different forms. For example as in the system function $S_{K2}$, there can be a strong deviation of the coil current 24 within a narrow range of the deflection variable, or as in the system function $S_{K3}$, there can be a small deviation of the coil current 24 occurring over a wide range of the deflection variable.

Figure 8:
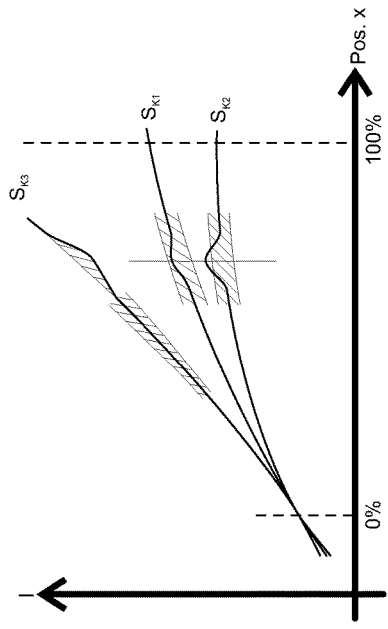
FIG. 8 represents a section of the position/current graph of FIG. 6 with the system functions $S_{K1}$, $S_{K2}$ and $S_{K3}$ of a system-characterizing means of a force-measuring device in which the flexure pivots, elastic joints or diaphragm springs have been damaged, showing possible threshold values for the system functions.

FIG. 8 is an enlarged representation of the rectangular portion of FIG. 7 that is framed with broken lines. A comparison between a system reference means 30 and a system-characterizing means 29 entails a quantitative characterization of the deviation as well as a qualitative characterization based on a threshold value. The threshold value can for example be defined as a tolerance band whose boundaries may not be crossed or, as shown for the system function SK3, a limit value can be set for the area enclosed between the system reference means 30 and the system-characterizing means 29, or the two possibilities can be combined. The tolerance band does not need to have the same width over the entire deflection range. The width can also be dependent on the deflection variable, so that a narrower tolerance can be defined for a deviation of the system function of a system-characterizing means 29 in the vicinity of the balanced position. This makes it possible to ensure that the most different symptoms in the system function can be quantified and their significance can be qualified.

Figure 9:
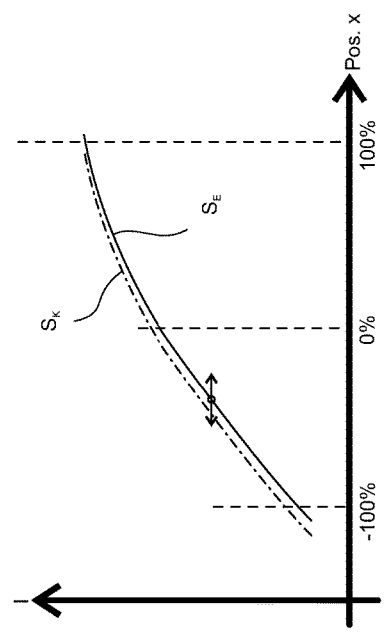
FIG. 9 represents a position/current graph over the entire deflection range of the coil, with a system function $S_K$ of a system-characterizing means of a force-measuring device exhibiting a shift in the position measurement in comparison to a system function $S_E$ of a system reference means.

FIG. 9 demonstrates the effect that a dislocation of the position sensor 21 has on a system function $S_K$ of a system-characterizing means 29. If the position sensor 21 is no longer in the same position in which the adjustment was performed, the system function $S_K$ of the system-characterizing means 29 in the position/current graph will be shifted horizontally relative to the system function $S_E$ of the system reference means 30. Thus, a deviation can be detected easily and quickly.

Figure 10:
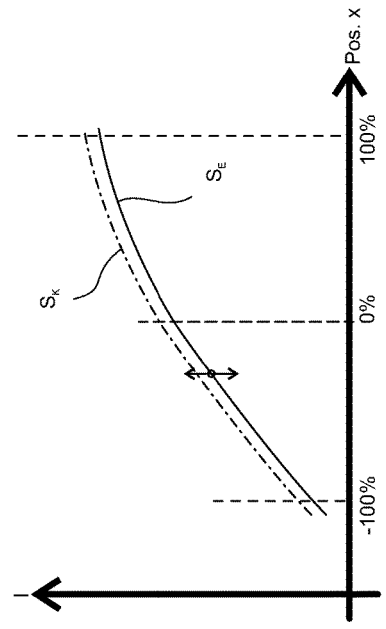
FIG. 10 represents a position/current graph over the entire deflection range of the coil, with a system function $S_K$ of a system-characterizing means of a force-measuring device in which the coil has shifted from its centered position in the magnet system in comparison to a system function $S_E$ of a system reference means.

FIG. 10 shows how a dislocation of the coil 25, 125 from its centered position in the magnet system 27, 127 affects the system-characterizing means 29. Analogous to the example of FIG. 9, the dislocation of the coil results in a system function $S_K$ which is shifted in the vertical direction of the graph in relation to the system function $S_E$ of the system reference means 30, which means that in all deflected positions of the coil 25, 125 a stronger current 24 will flow through the coil 25, 125 than in the adjusted condition. In both cases, i.e. with the dislocation of the coil 25, 125 from its centered position in the magnet system 27, 127 and with the dislocation of the position sensor 21, appropriate tolerances or threshold values need to be defined, preferably with narrower tolerances in the vicinity of the balanced position.

It has been found that a system reference means 30 and a system-characterizing means 29 are dependent on the mass of the weighing load. In other words, the values of the system table and/or the parameters of the system function of a system reference means 30 or of a system-characterizing means 29 are valid for a specific magnitude of the applied load. This is illustrated in FIGS. 6, 7 and 8 through the different system functions $S_{E1}$, $S_{E2}$, $S_{E3}$ and $S_{K1}$, $S_{K2}$, $S_{K3}$. The larger the force that is acting on the movable parallel leg 12, 112, the stronger will be the curvature of a system function in the position/current graph. The graphs of the system functions SE3 and SK3 are curved upwards. This curvature results from a change in the direction of the force in the measurement transducer 20, 120, which occurs for example in push-pull systems. The system reference means 30 and the system-characterizing means 29 therefore include at least one system table and/or a system function with the corresponding parameters, the system table and/or the system function is used to verify the functionality when the applied force on which it is based agrees most closely with the actually applied load, or else an interpolation is made between two values of the system table or between two system functions.

Although the invention has been described by presenting several examples of specific embodiments, it is considered evident that numerous further variants could be created based on the teachings of the present invention, for example by combining features of the individual embodiments with each other and/or by interchanging individual functional units between the embodiments.

What is claimed is:

1. A method for verifying a functionality of a force-measuring device which works according to the principle of electromagnetic force compensation, the force measuring device comprising a stationary parallel leg, a movable parallel leg which receives the load of a weighing object, two parallel guides that connect the stationary and movable parallel legs, a measurement transducer that is coupled to the movable parallel leg through a force-transmitting connection and that comprises a coil that is arranged with guided mobility in a magnet system and that can carry an electric current, a position sensor, arranged to detect a deflection of the coil from a balanced position relative to the magnet system, the deflection occurring as a result of placing a load on the movable parallel leg, such that an electric current flows through the coil by way of the electromagnetic force acting between the coil and the magnet system to return to, or to maintain in, the balanced position the coil and the movable parallel leg, which is connected to either the coil or the magnet system, and a regulating unit for regulating the amperage of the electric current in response to the position sensor signal such that the coil returns to the balanced position, the method comprising the steps of:

establishing, by means of a processor unit, at least one system-characterizing resource of the force-measuring device, and comparing at least one unchangeable system reference resource, which is stored in a persistent memory file of the processor unit to the system-characterizing resource, the comparison resulting in a determination of the functionality of the force-measuring device; and using a magnitude of the amperage and a magnitude of the deflection of the coil from the balanced position to verify the determined functionality, wherein each of the at least one system-characterizing resource and the at least one system reference resource establishes a relationship between the amperage of the electric current and the magnitude of the coil deflection.

2. The method of claim 1, wherein:

one of the at least one system reference resource represents the functionality of the force-measuring device at the time of an initial adjustment, that is, adjustment that:

took place during production or close to the completion of the force-measuring device; or reflects the condition of a fault-free functionality of the force-measuring device.

3. The method of claim 1, wherein:

either the at least one system-characterizing resource, the at least one system reference resource, or both, includes a system table that lists the respective values of the weight force of the applied load associated with different magnitudes of the deflection of the coil from its balanced position and with different amperages of the electric current, and/or a system function with at least one parameter and with at least the magnitude of the deflection of the coil and the amperage of the electric current as input quantities.

4. The method of claim 3, wherein:

the at least one parameter of the system function is stored as a parameter table, wherein the at least one parameter of the system function is load-dependent.

5. The method of claim 3, further comprising the step of:

determining the values of the system table, the at least one parameter of the system function, or both, by at least one of the steps of:

varying the deflection of the coil and measuring, at essentially the same time, the amperage of the electric current caused by the deflection of the coil; and varying the amperage of the electric current and measuring, at essentially the same time, the deflection of the coil caused by the amperage of the electric current.

6. The method of claim 5, wherein:

the step of determining the values of the system table, the at least one parameter of the system function, or both, is conducted both with and without a weight being applied to the movable parallel leg, wherein the weight is either an externally handled weight or a weight set in place internally by a handling mechanism.

7. The method of claim 1, wherein:

each at least one system reference resource is established either individually for each force-measuring device or generically for a given type of force-measuring device.

8. The method of claim 1, wherein:

the result obtained from the comparing steps is used to do at least one of the following:

to investigate a fracture, tear, or deformation of a pivot of the parallel-guiding mechanism;

to investigate a position change of the coil relative to an original position thereof; and to investigate a position change of the position sensor relative to an original position thereof, wherein the respective original positions are associated with the condition of the force-measuring device in which the system reference resource was established.

9. The method of claim 1, further comprising the steps of:

establishing a trend line of the functionality, based on the currently determined system-characterizing resource and the previously established system-characterizing means; and predicting the future functionality, based on the established trend line.

10. The method of claim 4, further comprising the step of:

determining the values of the system table, the at least one parameter of the system function, or both, by at least one of the steps of:

varying the deflection of the coil and measuring, at essentially the same time, the amperage of the electric current caused by the deflection of the coil; and varying the amperage of the electric current and measuring, at essentially the same time, the deflection of the coil caused by the amperage of the electric current.

11. The method of claim 10, wherein:

the step of determining the values of the system table, the at least one parameter of the system function, or both, is conducted both with and without a weight being applied to the movable parallel leg, wherein the weight is either an externally handled weight or a weight set in place internally by a handling mechanism.

12. The method of claim 9, wherein the future functionality is predicted for the time remaining until the next service of the force-measuring system.

13. A gravimetric force-measuring device, working according to the principle of electromagnetic force compensation, comprising:

a processor configured with instructions, stored on a non-transitory, computer-readable medium, to perform the method of claim 1.

14. A non-transitory, computer-readable medium with instructions stored thereon, that when executed by a processor that is a part of a force-measuring device operating according to the principle of electromagnetic force compensation, perform the steps of claim 1, by using, as input values, at least the amperage of the electric current and the magnitude of the deflection of the coil from a balanced position thereof, to issue a signal for initiating an action of the force-measuring device.

15. The computer-readable medium of claim 14, wherein:

the instructions include a step of recalling, from a persistent memory file of the processor, a system reference resource and at least one system-characterizing resource.

* * * * *